United States Patent [19]
Weman

[11] 3,927,901
[45] Dec. 23, 1975

[54] MOTOR VEHICLE EQUIPPED WITH INFLATABLE AIR BAGS FOR PASSENGER ACCIDENT PROTECTION

[75] Inventor: Per Olaf Weman, Haslah, Germany

[73] Assignee: Sigmatex, Basel, Switzerland

[22] Filed: Mar. 16, 1973

[21] Appl. No.: 342,124

[52] U.S. Cl. ............ 280/150 AB; 293/71 P; 293/1; 180/91
[51] Int. Cl.² ................ B60R 19/10; B60R 21/06
[58] Field of Search ...... 280/150 AB, 6.1; 293/71 P, 293/71 R, 1; 180/91

[56] References Cited
UNITED STATES PATENTS

| | | | |
|---|---|---|---|
| 1,784,387 | 12/1930 | Postel | 293/71 P |
| 2,834,606 | 5/1958 | Bertrand | 280/150 AB |
| 3,162,433 | 12/1964 | Smirl | 280/6.1 |
| 3,370,886 | 2/1968 | Frost | 280/150 AB |
| 3,495,675 | 2/1970 | Hass et al. | 280/150 AB |
| 3,708,194 | 1/1973 | Amit | 280/150 AB |

FOREIGN PATENTS OR APPLICATIONS

| | | | |
|---|---|---|---|
| 953,312 | 2/1962 | United Kingdom | 280/150 AB |

Primary Examiner—Leo Friaglia
Assistant Examiner—Jack D. Rubenstein
Attorney, Agent, or Firm—Jonathan Plaut; John P. Kirby, Jr.

[57] ABSTRACT

In a motor vehicle, a safety assembly consisting of a pressurized gas tank and several inflatable air bags connected to the tank through automatic valves whereby the tank is sensitive to impact to cause inflation of the air bags.

10 Claims, 3 Drawing Figures

3,927,901

MOTOR VEHICLE EQUIPPED WITH INFLATABLE AIR BAGS FOR PASSENGER ACCIDENT PROTECTION

BACKGROUND OF THE INVENTION

The present invention relates to a motor vehicle equipped with one or several inflatable air bags for protecting one or several passengers respectively of the vehicle in case of an accident.

Heretofore, a compressed-air cylinder was provided for inflating an associated air bag. In prior art arrangements of this type there is provided a compressed air cylinder for inflating an air bag. The cylinder is connected to a valve which is in turn controlled by a sensor device sensing the vehicle deceleration. These sensor mechanisms are relatively complicated and there is always the risk that an inadvertent response may be produced when the vehicle is strongly braked so that as a result the air bags are inflated without the vehicle being involved in an accident. Any faults on the other hand may have the effect that the compressed air cylinder will not be opened in case of an accident. Additionally, the installation of compressed air cylinders and sensors in a motor vehicle is rather expensive.

SUMMARY OF THE INVENTION

It is therefore an object of the present invention to provide a novel and improved arrangement that does not require any sensors, is of a relatively simpler design than prior art devices and is less likely to develop faults.

It is another object of the present invention to provide a novel and improved air bag assembly in which the compressed air required for inflating the air bags may serve other utilities in the motor vehicle as well.

It is another object of the present invention to provide a novel and improved inflatable air bag assembly for passenger accident protection in motor vehicles.

In accordance with the present invention there is mounted a pressurized gas tank in the front region of the motor vehicle, the pressurized gas tank extends at least partly transversely of the motor vehicle longitudinal axis from one side to the opposite side of the vehicle, one or several automatic valves are connected at their one side in appropriate locations to the pressurized gas tank, and each valve is connected at its other side to an associated inflatable air bag.

When the pressurized gas tank is filled with a gas at a pressure preferably in the range from 28 to 142 psig, any accident in which the vehicle becomes involved results in a sudden pressure increase which causes the valve to open with the result of an instantaneous inflation of the air bags, due to the high gas pressure within the reservoir. Advantageously, each of the valves is mounted on an associated air bag or in the connection area of gas supply pipe and air bag because with such an arrangement the pressurized gas contained in the gas supply pipe may be utilized for inflating the air bag.

In an advantageous embodiment, the pressurized gas tank is of an approximately U-shaped configuration and a central portion of the pressurized gas tank extends underneath the floor of the passenger compartment of the vehicle. This allows to provide relatively short gas supply pipes to the individual air bags whereby these gas supply pipes consist of branch pipes directly connected to the central portion of the gas tank. The same advantage is obtained in another embodiment in which the pressurized gas tank may be of an approximately U-shaped configuration whereby a central portion of the tank extends along the front of the motor vehicle. In the latter embodiment, the gas supply pipe may be connected to the two lateral branches of the tank. A gas tank of an U-shaped configuration serves at the same time to increase the stability of the vehicle.

According to a another embodiment the pressurized gas tank may be of a continuous approximately rectangular configuration and extend in a suitable plane about the outer contours of the vehicle. In this embodiment the air bags will be inflated if the vehicle encounters a collision on any side.

Since in the majority of accidents the vehicle front hits an obstacle, in all of the above described embodiments the pressurized gas tank or a portion thereof may form a part of a front bumper bar assembly of the vehicle.

For filling the pressurized gas tank there is preferably provided a valve allowing to introduce compressed air at the required pressure into the tank. The valve may be of the type used on motor vehicle tires and similarly adapted to be connected to conventional pressure source outlets in petrol stations. For increased safety the pressurized gas tank may be coupled to a compressor driven by the engine of the motor vehicle. Suitable control devices may be employed for automatically refilling the pressurized gas tank if the gas pressure therein falls below a predetermined lower limit.

The pressurized gas and the relatively large quantity of air available in the tank may be utilized for different purposes as well, for example by connecting the pressurized gas tank to the combustion air intake duct of the engine of the motor vehicle. Such an arrangement allows to temporarily increase the engine power such as by means of turbo charging, particularly for so-called quick starts.

In other embodiments the pressurized gas tank may be connected to a servo brake motor of the motor vehicle or to pneumatic type shock absorbers connected to the wheels of the motor vehicle, in order to improve upon the operation or performance of these mechanisms.

DESCRIPTION OF THE DRAWINGS

In the following, some illustrative embodiments of the present invention will be described with reference to the appended drawing wherein.

DETAILED DESCRIPTION

Figure 1:
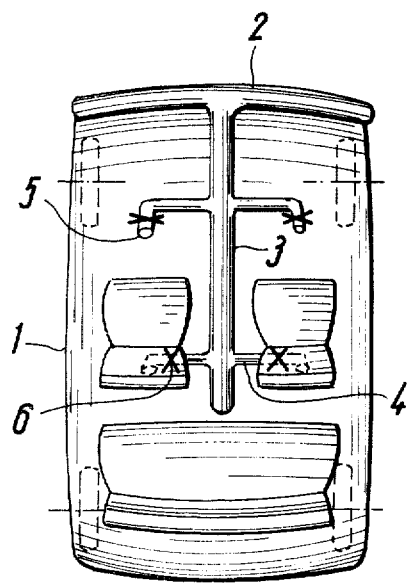
FIG. 1 is a top schematical view of a motor vehicle equipped with a T-shaped pressurized gas tank.

Referring to FIG. 1 of the drawing, a motor vehicle 1 indicated generally by the reference numeral 1 is equipped with a generally T-shaped pressurized gas tank 2 of which a portion extends in the front section of the motor vehicle from one side to the opposite side of the same. A center portion 3 of the pressurized gas tank 2 extends underneath the floor of the passenger compartment centrally of the vehicle from the front end towards the rear thereof. The center portion 3 is connected through four gas supply pipes 4 to four associated air bags 5 each of which is arranged in front of a respective passenger seat within the vehicle. In each connection area between a gas supply pipe 4 and an associated air bag 5 there is mounted a valve 6 which is schematically indicated in the drawing by a cross X.

The pressurized gas tank 2 is filled with air at a pressure of about 85 psig. If the motor vehicle 1 hits with its front portion an obstacle the impact causes the generation of a pressure wave within the pressurized gas tank 2. This pressure wave propagates from its point of origin throughout the tank 2 towards the valves 6 and causes the valves to open. This pressure increase in the tank 2 thus serves to instantaneously inflate the air bag 5.

Figure 2:
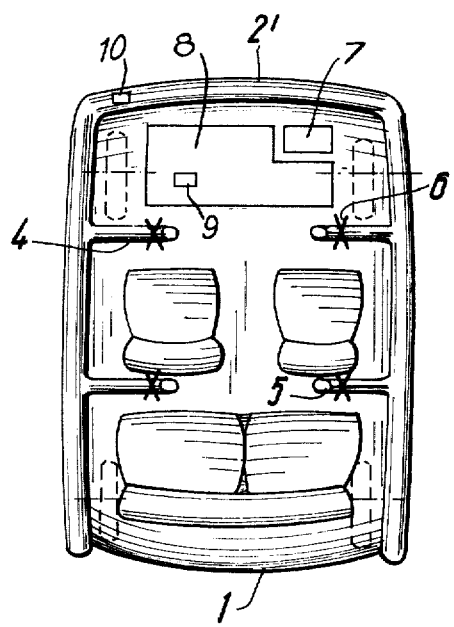
FIG. 2 is a schematical top view of a motor vehicle equipped with an U-shaped pressurized gas tank.

Referring to FIG. 2, this embodiment differs from the one of FIG. 1 by the fact that the pressurized gas tank 2' is of an U-shaped configuration and the gas supply pipes 4 are connected to either of the two lateral branches of the tank 2'. This configuration of the tank is advantageous since it enhances considerably the stability of the whole vehicle. The pressurized gas tank may be coupled to a compressor 7 driven by the engine 8 of the motor vehicle 1.

Figure 3:
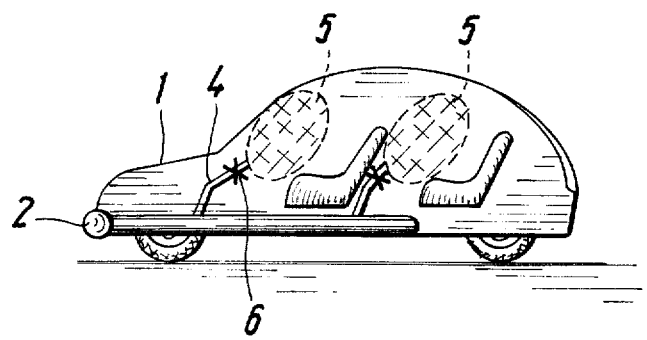
FIG. 3 is a schematical cross-sectional elevational view of a motor vehicle equipped with a pressurized gas tank.

In another embodiment shown in FIG. 3 a front portion of the pressurized gas tank 2 extends slightly beyond the front end of the vehicle 1 and may directly form the front bumper bar or a part of a front bumper bar assembly of the motor vehicle. The pressurized gas and the relatively large quantity of air available in the tank 2 may be utilized for different purposes as well; for example, by connecting the pressurized gas tank 2 to the combustion air intake duct 9 of the engine 8 of the motor vehicle. For filling the pressurized gas tank 2, there is preferably provided a valve 10 allowing compressed air to be introduced at the required pressure into the tank 2. The valve may be of the type used on motor vehicle tires and is adapted to be connected to a conventional pressure source outlet in gasoline or petrol stations.

Various further modifications and embodiments will be readily apparent to the one skilled in the art. Thus the pressurized gas tank may likewise be of a continuous "annular" shape, i.e. extend around the whole vehicle.

Since many embodiments and variations may be made of this invention, it is not intended to limit the scope of this invention to the specific description above, but only by the claims following hereinafter.

What is claimed is:

1. In a vehicle equipped with at least one inflatable air bag for protecting at least one passenger of the vehicle in case of an accident, wherein an inflation assembly for said bag comprises: a pressurized gas tank having a front portion and at least one branch portion in a continuous configuration extending from said front portion of said pressurized gas tank, said branch portion connecting said front portion to said at least one inflatable air bag, said front portion mounted in the front region of the vehicle and extending transversely of the vehicle longitudinal axis from one side to the opposite side of the vehicle; and at least one automatic valve, said one automatic valve connected between the pressurized gas tank and each associated inflatable air bag, said pressurized gas tank inflating said air bag upon impact during an accident, without the use of separate sensors, due to a sudden increase in pressure within the gas tank which causes said valve to open.

2. An inflation assembly for a vehicle as defined in claim 1 wherein each of the valves is mounted on an associated air bag.

3. A motor vehicle as defined in claim 1 wherein said pressurized gas tank is of an approximately T-shaped configuration and a central portion of said pressurized gas tank extends underneath the floor of the passenger compartment of the vehicle.

4. An inflation assembly for a vehicle as defined in claim 1 wherein said pressurized gas tank has an approximately U-shaped configuration and a central portion of said pressurized gas tank extends along the front of the motor vehicle.

5. An inflation assembly for a vehicle as defined in claim 1 wherein said pressurized gas tank extends about the contours, including along the sides, of the vehicle.

6. An inflation assembly for a vehicle as defined in claim 1 wherein said pressurized gas tank or a portion thereof forms a part of a front bumper bar assembly of the vehicle.

7. An inflation assembly for a vehicle as defined in claim 6 wherein said pressurized gas tank is filled with a gaseous fluid at a pressure in the range from 28 to 142 psig.

8. An inflation assembly for a vehicle as defined in claim 1 and further comprising a compressor driven by the engine of the motor vehicle, said pressurized gas tank being coupled to said compressor.

9. A motor vehicle as defined in claim 8 wherein said pressurized gas tank is connected to the combustion air intake duct of the engine of the motor vehicle.

10. An inflatable air bag assembly as defined in claim 1 wherein on said pressurized gas tank is mounted a conventional tire inflator valve.

* * * * *

UNITED STATES PATENT AND TRADEMARK OFFICE
CERTIFICATE OF CORRECTION

PATENT NO. : 3,927,901
DATED : December 23, 1975
INVENTOR(S) : Per Olaf Weman

It is certified that error appears in the above—identified patent and that said Letters Patent are hereby corrected as shown below:

Column 4, line 10 "said one" should be --one said--.

Column 4, line 19 delete "A motor", insert --An inflation assembly for a--.

Column 4, lines 48-50 delete "inflatable air bag", insert --inflation-- after "An"; insert --for a vehicle-- after "assembly"; delete "on said pressurized gas tank is mounted" after "wherein"; insert --is mounted on said pressurized gas tank-- after "valve".

Signed and Sealed this

Tenth Day of May 1977

[SEAL]

Attest:

RUTH C. MASON
*Attesting Officer*

C. MARSHALL DANN
*Commissioner of Patents and Trademarks*